(12) United States Patent
Viswanathan

(10) Patent No.: US 12,521,174 B2
(45) Date of Patent: Jan. 13, 2026

(54) APPARATUS AND METHODS FOR TISSUE ABLATION

(71) Applicant: Alpfa Medical, Inc., Menlo Park, CA (US)

(72) Inventor: Raju Viswanathan, Palo Alto, CA (US)

(73) Assignee: Alpfa Medical, Inc., Menlo Park, CA (US)

( * ) Notice: Subject to any disclaimer, the term of this patent is extended or adjusted under 35 U.S.C. 154(b) by 0 days.

(21) Appl. No.: 19/094,761

(22) Filed: Mar. 28, 2025

(65) Prior Publication Data

US 2025/0221761 A1    Jul. 10, 2025

Related U.S. Application Data

(63) Continuation of application No. PCT/US2023/075681, filed on Oct. 2, 2023.
(Continued)

(51) Int. Cl.
*A61B 18/14*        (2006.01)
*A61B 17/00*        (2006.01)
(Continued)

(52) U.S. Cl.
CPC ...... *A61B 18/1482* (2013.01); *A61B 18/1477* (2013.01); *A61N 1/327* (2013.01);
(Continued)

(58) Field of Classification Search
CPC ............ A61B 18/1482; A61B 18/1477; A61B 2017/00862; A61B 2018/00077;
(Continued)

(56) References Cited

U.S. PATENT DOCUMENTS 5,476,495 A    12/1995  Kordis et al.
5,494,042 A     2/1996  Panescu et al.
(Continued)

FOREIGN PATENT DOCUMENTS

EP         1613387 B1      1/2008
WO    WO-2016060983 A1     4/2016
(Continued)

OTHER PUBLICATIONS

International Preliminary Report on Patentability for International Application No. PCT/US2023/068807 mailed Jan. 2, 2025, 12 pages.
(Continued)

*Primary Examiner* — Theodore J Stigell
(74) *Attorney, Agent, or Firm* — COOLEY LLP

(57) ABSTRACT

Systems, devices, and methods described herein relate to catheter devices for therapy delivery. In some embodiments, a catheter device includes a shaft and a needle, where the shaft defines a lumen configured to slidably receive the needle such that the needle can be advanced distally beyond the shaft to penetrate into a tissue site. The shaft further including a first electrode, and the needle including a second electrode, where the first and second electrodes are configured to deliver electroporation to the tissue site.

17 Claims, 15 Drawing Sheets

Related U.S. Application Data

(60) Provisional application No. 63/412,201, filed on Sep. 30, 2022.

(51) Int. Cl.
*A61B 18/00* (2006.01)
*A61N 1/32* (2006.01)

(52) U.S. Cl.
CPC .............. *A61B 2017/00862* (2013.01); *A61B 2018/00077* (2013.01); *A61B 2018/00083* (2013.01); *A61B 2018/00267* (2013.01); *A61B 2018/00482* (2013.01); *A61B 2018/00541* (2013.01); *A61B 2018/00577* (2013.01); *A61B 2018/00613* (2013.01); *A61B 2018/0075* (2013.01); *A61B 2018/00767* (2013.01); *A61B 2018/00982* (2013.01); *A61B 2018/1407* (2013.01); *A61B 2018/1425* (2013.01); *A61B 2018/144* (2013.01); *A61B 2018/1467* (2013.01)

(58) Field of Classification Search
CPC A61B 2018/00083; A61B 2018/00267; A61B 2018/00482; A61B 2018/00541; A61B 2018/00577; A61B 2018/00613; A61B 2018/0075; A61B 2018/00767; A61B 2018/00982; A61B 2018/1407; A61B 2018/1425; A61B 2018/144; A61B 2018/1467; A61N 1/327
See application file for complete search history.

(56) References Cited

U.S. PATENT DOCUMENTS

| | | | |
|---|---|---|---|
| 5,904,680 | A | 5/1999 | Kordis et al. |
| 6,086,532 | A | 7/2000 | Panescu et al. |
| 7,070,596 | B1 * | 7/2006 | Woloszko .......... A61B 18/1482 606/41 |
| 8,048,067 | B2 | 11/2011 | Davalos et al. |
| 8,504,147 | B2 | 8/2013 | Deem et al. |
| 8,870,863 | B2 | 10/2014 | Leung et al. |
| 9,387,031 | B2 | 7/2016 | Stewart et al. |
| 10,136,942 | B1 | 11/2018 | Cosman, Jr. et al. |
| 10,722,288 | B2 | 7/2020 | Wu et al. |
| 10,893,905 | B2 | 1/2021 | Viswanathan et al. |
| 11,633,230 | B2 | 4/2023 | Stewart et al. |
| 11,974,804 | B2 | 5/2024 | Zarins et al. |
| 12,076,072 | B2 | 9/2024 | Athos et al. |
| 12,114,919 | B2 | 10/2024 | Forsyth et al. |
| 12,150,698 | B2 | 11/2024 | Viswanathan et al. |
| 12,239,364 | B2 | 3/2025 | Govari et al. |
| 2001/0012934 | A1 | 8/2001 | Chandrasekaran et al. |
| 2002/0087208 | A1 | 7/2002 | Koblish et al. |
| 2011/0087211 | A1 | 4/2011 | Kulesa et al. |
| 2012/0157993 | A1 | 6/2012 | Jenson et al. |
| 2012/0265198 | A1 | 10/2012 | Crow et al. |
| 2013/0030430 | A1 | 1/2013 | Stewart et al. |
| 2015/0289929 | A1 | 10/2015 | Toth et al. |
| 2016/0113709 | A1 | 4/2016 | Maor |
| 2017/0065339 | A1 | 3/2017 | Mickelsen |
| 2018/0117287 | A1 | 5/2018 | Krautkremer et al. |
| 2019/0298442 | A1 | 10/2019 | Ogata et al. |
| 2020/0205892 | A1 * | 7/2020 | Viswanathan ..... A61B 18/1492 |
| 2021/0085387 | A1 | 3/2021 | Amit et al. |
| 2021/0161582 | A1 | 6/2021 | Byrd et al. |
| 2023/0054269 | A1 | 2/2023 | Govari et al. |
| 2023/0149070 | A1 | 5/2023 | Olson et al. |
| 2024/0099769 | A1 | 3/2024 | Sharma |
| 2024/0180613 | A1 | 6/2024 | D'Agostino et al. |
| 2024/0216052 | A1 | 7/2024 | Rodriguez et al. |
| 2025/0000574 | A1 | 1/2025 | Bar-Tal et al. |
| 2025/0009404 | A1 | 1/2025 | Sabban et al. |
| 2025/0082396 | A1 | 3/2025 | Bar-Tal et al. |
| 2025/0120764 | A1 | 4/2025 | Viswanathan |
| 2025/0246316 | A1 | 7/2025 | Villongco et al. |

FOREIGN PATENT DOCUMENTS

| | | | |
|---|---|---|---|
| WO | WO-2016090175 | A1 | 6/2016 |
| WO | WO-2019055512 | A1 | 3/2019 |
| WO | WO-2021119479 | A1 | 6/2021 |
| WO | WO-2021195311 | A1 | 9/2021 |
| WO | WO-2022058865 | A1 | 3/2022 |
| WO | WO-2022192522 | A1 | 9/2022 |
| WO | WO-2023220419 | A1 | 11/2023 |
| WO | WO-2023235337 | A1 | 12/2023 |
| WO | WO-2023250370 | A1 | 12/2023 |
| WO | WO-2024041285 | A1 | 2/2024 |
| WO | WO-2024/047215 | A1 * | 3/2024 |
| WO | WO-2024073765 | A2 | 4/2024 |
| WO | WO-2024092134 | A1 | 5/2024 |
| WO | WO-2024157117 | A1 | 8/2024 |

OTHER PUBLICATIONS

International Search Report and Written Opinion for International Application No. PCT/US2023/075681 dated Apr. 3, 2024, 16 pages.
International Search Report and Written Opinion for PCT Application No. PCT/US2023/068807 dated Oct. 11, 2023, 20 pages.
Invitation to pay additional fees and Partial Search Report for International Application No. PCT/US2023/075681, dated Feb. 8, 2024, 11 pages.
Invitation to pay additional fees issued in International Application No. PCT/US2024/061649, date of mailing Mar. 27, 2025, 15 pages.
Non-Final Office Action for U.S. Appl. No. 18/999,981 mailed Apr. 15, 2025, 14 pages.
Final Office Action for U.S. Appl. No. 18/999,981 mailed Aug. 6, 2025, 11 pages.
International Search Report and Written Opinion for PCT Application No. PCT/US2024/061649 mailed May 20, 2025, 19 pages.
International Search Report and Written Opinion for PCT Application No. PCT/US2025/023151 mailed Jul. 11, 2025, 14 pages.

* cited by examiner

APPARATUS AND METHODS FOR TISSUE ABLATION

CROSS-REFERENCE TO RELATED APPLICATIONS

This application is a continuation of PCT Application No. PCT/US2023/075681, filed Oct. 2, 2023, titled "APPARATUS AND METHODS FOR TISSUE ABLATION," which claims priority to and the benefit of U.S. Provisional Patent Application No. 63/412,201, filed Sep. 30, 2022, titled "APPARATUS, SYSTEMS AND METHODS FOR TISSUE ABLATION," the disclosure of each of which are incorporated by reference in its entirety.

BACKGROUND

A significant proportion of cancer cases occur in the lung. Screening for lung cancer is often performed with a bronchoscope that provides image-guided access to nodules in the lung that may be potentially cancerous. A biopsy can be performed through the bronchoscope to evaluate the local tissue for signs of a tumor. If cancer is detected, therapeutic options include drugs or chemotherapy, interventional treatment methods such as radiofrequency (RF) ablation, or radiation therapy. Side effects associated with such treatments are common. In this context, the emerging modality of pulsed field ablation, or electroporation in both irreversible and reversible versions, has the potential to be a form of therapy that minimizes undesirable side effects. While thermal therapies like RF ablation can result in significant collateral damage since the resulting zone of tissue necrosis can include other tissue besides the lung and generate significant inflammation, pulsed field ablation is non-thermal, can be tissue-selective and can result in a smoother healing process with minimal inflammation.

Pulsed field ablation has emerged as a potentially useful ablation modality that has been investigated in some tumor applications and has recently been found to be fruitful in the context of cardiac ablation for the treatment of cardiac arrhythmias. This non-thermal ablation modality can be tissue selective and minimize collateral damage while also resulting in a post-ablation natural healing process that preserves the extracellular matrix and overall tissue integrity. While devices and waveforms have been previously devised that are appropriate in the cardiac ablation context, there is a need for new devices and tools that may be more appropriate for use in the context of ablation for the treatment of tumors in other types of soft tissue such as, for example, pulmonary tissue or pancreatic tissue.

BRIEF DESCRIPTION

The present disclosure addresses the need for minimally invasive devices for the efficient and effective delivery of pulsed field ablation therapy, especially for ablation of tumors of the lung and other tissue. Pulsed field ablation procedures can be rapid while at the same time minimizing collateral tissue damage often seen in thermal-based therapies. At the same time, post-procedural healing can be relatively quick with minimal side-effects.

The present disclosure describes tools and devices for minimally invasive access and therapy delivery for ablation of soft tissue such as, for example, pulmonary tissue or pancreatic tissue. The devices of the present disclosure are endoluminal catheter devices introduced via standard minimal access methods and can have a shaft with a lumen for passage of a wire or needle device whose distal portion has at least one electrode disposed along it. In embodiments, the distal portion of the shaft can also have one or more electrodes disposed on it. In embodiments, the distal shaft electrode can comprise an expandable or a deformable member comprising a shape memory alloy such as, for example, Nitinol.

The distal electrode on the wire or needle can comprise at least one bulbous portion near the distal tip of the wire. In embodiments, the bulbous portion can be substantially spherical in geometry. In embodiments, there can be an electrically non-conducting tapered portion of the wire or needle disposed distal to the bulbous electrode portion. In alternate embodiments, the distal electrode can also comprise an electrically conducting tapered portion distal to the bulbous portion. In embodiments, the taper can narrow to a fine point, e.g., for penetrating into tissue. In embodiments, the tapered portion can comprise a multiplicity or sequence of separate tapers. In embodiments, the length of the wire or needle, other than the exposed distal electrode portion, is electrically insulated or comprises an insulator. In embodiments, the insulation is configured to withstand a voltage of at least about 300 Volts across its thickness without dielectric breakdown. In embodiments, the insulation is configured to withstand a voltage of at least about 700 Volts across its thickness without dielectric breakdown. In embodiments, the insulation can be configured to withstand voltages between at least about 300 Volts and at least about 700 Volts across its thickness without dielectric breakdown, including, for example, at least about 400 Volts, at least about 500 Volts, or at least about 600 Volts. In embodiments, the wire can be hollow, and an insulated electrical lead can run through the hollow portion and connect to the distal electrode on the wire. In embodiments, the insulation of the electrical lead is configured to withstand a voltage of at least about 300 Volts across its thickness without dielectric breakdown.

In some embodiments, the lumen in the shaft of the catheter device also carries an insulated electrical lead connecting to the distal shaft electrode. In embodiments, the insulation of the electrical lead is configured to withstand a voltage of at least about 300 Volts across its thickness without dielectric breakdown. In embodiments, the electrical lead can pass through a second lumen in the shaft of the catheter device. In embodiments, the distal shaft electrode in the form of a deformable member can comprise a structure in the form of a basket or cage-like structure, which in its relaxed state has a diameter that is larger than the diameter of the catheter shaft. When passed through a body cavity or passageway such as a bronchial tree, the cage-like structure naturally assumes a compressed shape where constrained by the wall of the body cavity such that the distal electrode fits within the inner diameter of the body cavity or passageway; where the cage-like structure is not mechanically constrained, the distal electrode retains the relaxed-state diameter (e.g., expanded diameter) of its cage-like structure.

In use, in embodiments, the catheter may pass through a lumen or working channel of an endoscopic instrument such as a bronchoscope or endoscope that can be deflected or steered and navigated to a desired part of the anatomy in a passageway (for example, a bronchial tree or a digestive tract), e.g., under image guidance via the endoscopic instrument. Imaging devices or instruments such as optical imaging devices or ultrasound imaging devices implemented via an appropriate probe passed through an imaging lumen of the endoscopic instrument can be used to visualize and guide placement of the distal end of the catheter as the distal portion of the catheter extends out of the endoscopic instrument and is placed or positioned at or near a region of interest, such as, for example, a nodule or tumor site. In embodiments, the catheter device of the present disclosure and the imaging or endoscopic instrument can be separately navigated devices that pass side-by-side through an anatomical passageway.

Once the catheter is appropriately placed in the anatomy of interest, the wire or needle is extended out of the catheter device and inserted into a tissue mass that is desirable to ablate, such as, for example, a tumor or nodule, with image guidance employed as needed. After appropriate insertion of the wire, electroporation ablation is delivered in the form of a series of high voltage pulses delivered as a suitable waveform, for instance, as described in International Patent Application No. PCT/US2023/025064, filed Jun. 12, 2022, and titled "Apparatus, Systems and Methods for Soft Tissue Ablation," the disclosure of which is incorporated herein by reference in its entirety. In embodiments, the distal electrode on the wire and the distal shaft electrode(s) of the catheter can have opposite electrical polarities for voltage delivery of the ablation waveform. In alternate embodiments, an electrical reference patch on the surface of the patient placed in skin contact with the patient can serve as an oppositely polarized electrode for electrical pairing with the distal electrode on the wire for voltage delivery of the ablation waveform. The electric field generated upon voltage waveform delivery within a volume of tissue around the distal region of the wire drives tissue ablation. In embodiments, the electric field in this tissue volume is large enough to generate irreversible electroporation of tissue, i.e., the tissue is killed. In other embodiments, the electric field within a tissue volume around the distal portion of the wire can reversibly electroporate tissue, rendering the cells in the tissue permeable to drugs over a period of time. In such embodiments, the wire or needle can be hollow for the direct infusion or delivery of tumor-treating drugs or therapeutic agents within the reversibly ablated zone or volume of tissue concomitant with or shortly after electroporation ablation is delivered. In this case, since only tissue within a desired zone is permeable to drugs, systemic and other side effects of tumor-treating drugs or therapeutic agents can be avoided.

Electroporation or pulsed field ablation application can be repeated at a given site as needed for an enhanced ablation effect before moving the catheter to a different location within the intended overall tissue volume and delivering ablation at a different location. In general, multiple such sites can be targeted in tumor or tissue mass; for example, between 1 and about 15 such locations can be targeted in each tumor mass, including all values and sub-ranges therebetween.

The voltage amplitude of the waveform can range between about 300 Volts and about 10,000 Volts, including all values and sub-ranges therebetween. In embodiments, the diameter of the catheter device can range between approximately 1 mm and approximately 6 mm, including all values and sub-ranges therebetween. In embodiments where there is a distal shaft electrode, the largest diameter of the distal shaft electrode in its relaxed state can range between approximately 1 mm and approximately 15 mm, including all values and sub-ranges therebetween. In embodiments, the wire can extend up to about 60 mm beyond the distal tip of the catheter shaft when fully deployed or extended.

In embodiments, the external diameter of the major proximal portion of the wire or needle (i.e., portion proximal to the bulbous portion in the distal region) can range between approximately 0.2 mm and approximately 3 mm, including all values and sub-ranges therebetween. In embodiments, the bulbous portion of the distal electrode of the wire can have a maximum diameter between approximately 0.4 mm and approximately 4 mm, including all values and sub-ranges therebetween. In embodiments, the length of the distal tapered portion of the wire distal to the bulbous portion of the electrode can range between approximately 1 mm and approximately 30 mm, including all values and sub-ranges therebetween. Any fraction of the length of the distal tapered portion of the wire can be electrically conducting according to the convenience of the embodiment and/or depending on the requirements of a particular application.

The electrodes of the catheter device including the wire or needle can be made of, for example, stainless steel, Nitinol, gold, platinum-iridium alloy, or other such biocompatible materials known in the art that are suitable for delivering electric current or voltage to tissue. The catheter shaft can comprise any of a wide variety of polymeric materials known to those skilled in the art, such as, for example, polyurethane, PEBAX, polyethylene, etc. In embodiments, the major proximal portion of the wire can be covered with electrically insulating material such as, for example, Teflon, Parylene, Kevlar, etc.

In embodiments, the distal shaft electrode can comprise a cage-like structure comprising struts made at least in part from a highly elastic but compliant material such as, for example, Nitinol. The electrode is mounted on the catheter shaft and, in embodiments, can be crimped securely to the shaft at one end of the electrode while the other end fits over the catheter shaft but is free to move or slide along the shaft as the cage structure deforms. In embodiments, the secured end of the electrode can have a collar portion that makes it easier for crimping or other secure attachment.

In some embodiments, an apparatus includes: an outer shaft defining a lumen; a first electrode disposed on a distal end of the outer shaft, the first electrode including a compressible basket; and an inner shaft slidably disposable in the lumen, the inner shaft including a distal tip having a bulbous portion and a tapered portion that tapers to a distal sharp end, the distal sharp end configured to be extended distal to the outer shaft and inserted into a tissue site, the distal tip including a second electrode, the first and second electrodes configured to deliver electroporation to a zone of tissue at the tissue site.

In some embodiments, an apparatus includes: an outer shaft defining a lumen; a ring electrode disposed on a distal end of the outer shaft; and an inner shaft slidably disposable in the lumen, the inner shaft including a distal tip having a bulbous portion and a tapered portion that tapers to a distal sharp end, the distal sharp end configured to be extended distal to the outer shaft and inserted into a tissue site, the distal tip including an exposed conductive portion, the ring electrode and the exposed conductive portion configured to deliver electroporation to a zone of tissue at the tissue site.

In some embodiments, a system includes: a catheter device including a shaft and a needle, the shaft defining a lumen configured to slidably receive the needle such that the needle can be advanced distally beyond the shaft to penetrate into a tissue site, the shaft including a distally located first electrode having a compressible basket and the needle including a distally located second electrode; and a pulse generator configured to be coupled to the catheter device, the pulse generator configured to generate and deliver voltage pulses to the catheter device such that the first and second electrodes are polarized with opposite polarities to deliver electroporation to a zone of tissue at the tissue site.

In some embodiments, a method includes: positioning a catheter device near a tissue site, the catheter device including a shaft and a needle slidably disposed therein, the shaft including a distally located first electrode having a compressible basket; extending the needle distally out from the shaft to insert a distal tip of the needle into a tissue site, the distal tip of the needle including a second electrode; and delivering voltage pulses to the first and second electrodes to electroporate a zone of tissue at the tissue site.

DETAILED DESCRIPTION

The device embodiments of the present disclosure provide device constructions and configurations for the delivery of electroporation or pulsed field ablation therapy for the ablation of soft tissue tumors. In embodiments, the devices are intended for minimally invasive use and in embodiments may be used through the working channel of an endoscopic instrument. In alternate embodiments of method of use, the device can be independently positioned and placed; in some such embodiments, the device can be deflectable to permit easier navigation.

Figure 1:
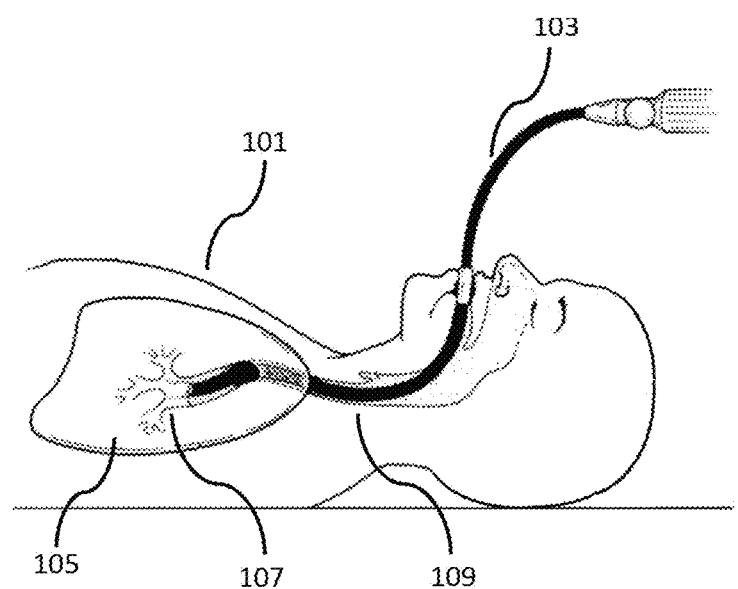
FIG. 1 is a schematic illustration of an endoscopic device in a subject anatomy indicating the trachea, lung and associated bronchial tree.
Figure 2:
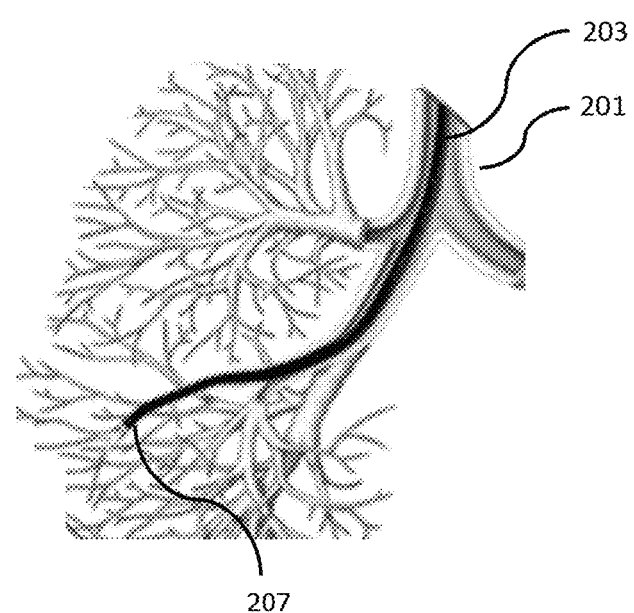
FIG. 2 provides an illustration of a subject anatomy including a bronchial tree network in a lung with device access path shown.

In the context of a pulmonary application, FIG. 1 illustrates endoscopic access to the lung via a bronchoscope 103 introduced into the trachea 109 of a subject 101 and advanced into the airways 107 of a lung 105. The branching network of the bronchial tree can be accessed at different sub-levels of the network. FIG. 2 illustrates in more detail the bronchoscope 203 passing through bronchial network 201 such that the tip 207 of the bronchoscope 203 is positioned for access to smaller branches of the bronchial network 201. In some cases, a pre-operative computed tomography (CT) image can be used as reference to guide the bronchoscope 203 to a location of interest, such as, for example, a lung nodule or tumor location.

Figure 3:
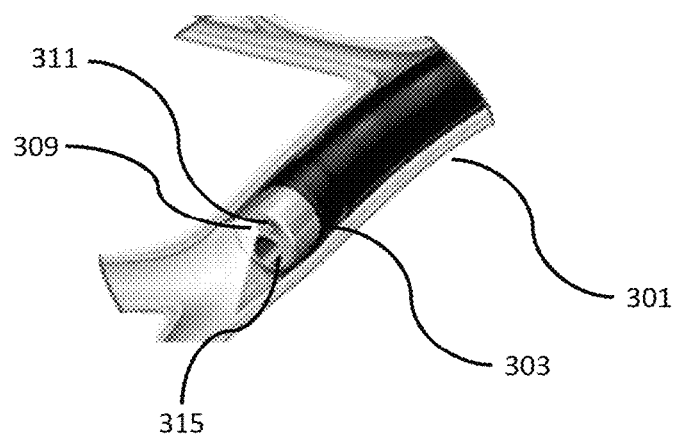
FIG. 3 is a schematic illustration of an endoscopic device engaging part of a bronchial tree and showing distinct device channels for an imaging device and for other working devices, according to embodiments.

FIG. 3 illustrates the distal portion of an endoscopic instrument 303 inserted in a body cavity or anatomical passage 301, for example, a bronchial tree or a digestive tract, and showing imaging channels 309 and 311 and a working channel 315 in the endoscopic instrument 303, according to embodiments. In this example, the imaging channel 309 is used to insert a light source for optical imaging, while a camera device can be inserted through imaging channel 311 for visualizing the illuminated interior of the passage 301. The working channel 315 can be used to insert other devices such as, for example, a catheter device for diagnosis or therapy delivery. In some cases, an ultrasonic imaging catheter can be passed through one of the imaging channels 309 and 311 of the endoscopic instrument 303 to provide an ultrasound image of the anatomical passage for visualization purposes.

Figure 13:
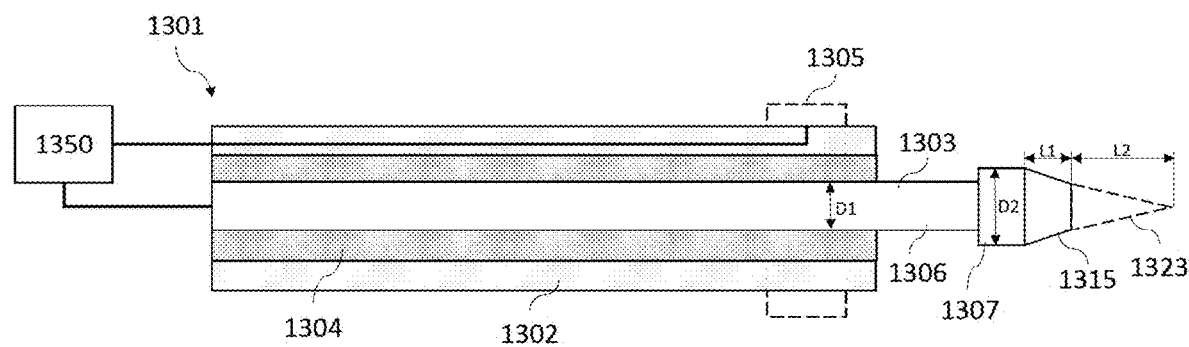
FIG. 13 schematically depicts a catheter device, according to embodiments.

FIG. 13 schematically illustrates a catheter device 1301 for delivering treatment or therapy, according to embodiments of the present disclosure. The catheter device 1301 can be structurally and/or functionally similar to other catheter devices described herein. The catheter device can have a shaft 1302 (e.g., an outer shaft or catheter shaft) that defines a lumen 1304, e.g., for receiving a wire or needle 1303 (e.g., an inner shaft).

In embodiments, the diameter of the catheter device 1301 and other catheter devices of the present disclosure can range between approximately 1 mm and approximately 6 mm, including all values and sub-ranges therebetween. In embodiments, the catheter devices can be passed through the working channel (e.g., working channel 315) of an endoscopic instrument, while in other embodiments, the catheter devices can be placed alongside an endoscopic instrument and disposed externally to it. In some embodiments, the catheter devices can be deflectable with deflection controlled from a catheter handle, as is commonly employed in interventional devices. For example, the catheter devices can be deflected using one or more pull wires. In embodiments, the catheter devices can have a distal shaft electrode, e.g., as described herein, while in alternate embodiments, there may be no distal shaft electrode and for ablation delivery electrical pairing, the distal wire electrode can be paired with a reference patch placed externally on the patient surface.

As shown in FIG. 13, the catheter device 1301 optionally has one or more electrodes 1305 that are disposed near a distal tip of the shaft 1302. The one or more electrodes 1305 can be implemented as expandable or compressible electrodes (e.g., compressible basket electrodes, cage electrodes, mesh electrodes, etc.) or ring electrodes. In embodiments where there is a distal shaft electrode (e.g., an electrode 1305) having an expandable structure, the largest or maximum diameter of the distal shaft electrode in its relaxed state can range between approximately 1 mm and approximately 15 mm, including all values and sub-ranges therebetween. The expandable structure can be formed at least in part from a highly elastic or superelastic but compliant material such as, for example, Nitinol. In some embodiments, there may be a single electrode 1305, which can be configured to pair with one or more electrodes disposed on another portion of the catheter device 1301 (e.g., the wire 1303) to deliver pulsed field ablation or electroporation. In some embodiments, there may be multiple electrodes 1305, which can be configured to pair with one another and/or with one or more electrodes disposed on another portion of the catheter device 1301 (e.g., the wire 1303) to deliver pulsed field ablation or electroporation.

As noted above, the wire 1303 can translate or slide within the lumen 1304 of the shaft 1302. The wire 1303 can be extended a predetermined distance out of the shaft 1302, e.g., to penetrate into a tissue site. In embodiments, the wire can extend up to about 60 mm beyond the distal tip of the catheter shaft when fully deployed or extended. The wire 1303 can include a major proximal portion 1306, a bulbous portion 1307, and one or more tapered portions 1315, 1323. In some embodiments, the wire can include a single tapered portion 1315 that tapers down to a penetrating point or distal sharp end, while in other embodiments, the wire includes two or more tapered portions 1315, 1323, where a distalmost tapered portion can taper down to a penetrating point or distal sharp end. The penetrating point can be a sharp end that can be configured to penetrate into a tissue site. In embodiments, the external diameter D1 of the major proximal portion of the wire or needle (i.e., portion proximal to the bulbous portion in the distal region) can range between approximately 0.2 mm and approximately 3 mm, including all values and sub-ranges therebetween. In embodiments, the bulbous portion of the distal electrode of the wire can have a maximum diameter D2 between approximately 0.4 mm and approximately 4 mm, including all values and sub-ranges therebetween. In embodiments, the length of the distal tapered portion (or portions) of the wire distal to the bulbous portion of the electrode (e.g., L1+L2) can range between approximately 1 mm and approximately 30 mm, including all values and sub-ranges therebetween. In some embodiments, the length L1 of a first distal tapered portion 1315 can be less than the length L2 of a second distal tapered portion 1323. In other embodiments, the length L1 of the first distal tapered portion 1315 can be the same or greater than the length L2 of the second distal tapered portion 1323. Any fraction (e.g., between and inclusive of 0 and 1) of the length of the distal tapered portion of the wire can be electrically conducting according to the convenience of the embodiment and/or depending on the requirements of a particular application. In some embodiments, the first tapered portion 1315 may be non-conductive while the second tapered portion 1323 may be conductive. In other embodiments, the first tapered portion 1315 may be conductive while the second tapered portion 1323 may be non-conductive. In other embodiments, both the first tapered portion 1315 and the second tapered portion 1323 can be conductive.

A generator 1350 can be coupled to the electrodes or conductive portions of the wire 1303 and to the electrode or electrodes 1305. The generator 1350 can be configured to deliver a series of high voltage pulses to the electrodes or conductive portions. In some embodiments, the generator 1350 can be configured to deliver energy in a unipolar mode. In the unipolar mode, one or more of the electrodes or conductive portions on the catheter device can be configured to have one electrical polarity, while a reference patch placed on a subject has the opposite electrical polarity. In some embodiments, the generator 1350 can be configured to deliver energy in a bipolar mode. In the bipolar mode, two different electrodes or subsets of electrodes on the catheter device are energized with opposite electrical polarities. In embodiments, the voltage amplitude of the waveforms described herein can range from approximately 300 V to approximately 10,000V depending on the application, including all values and ranges therebetween.

Figure 4A:
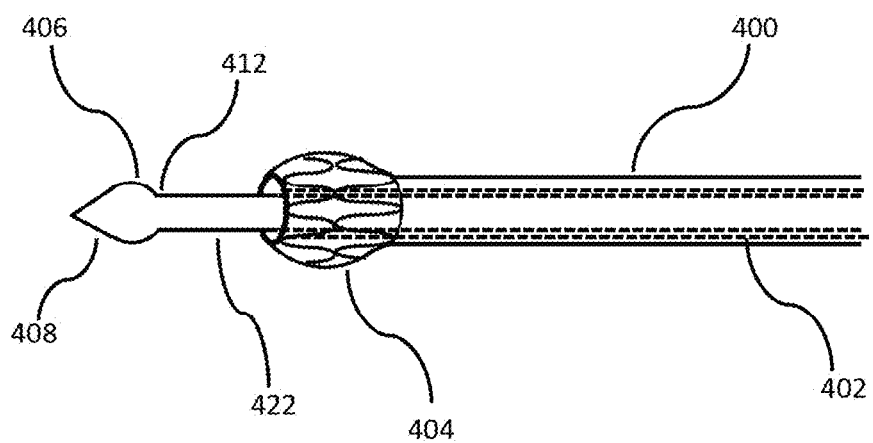
FIG. 4A illustrates a catheter device of the present disclosure with a distal shaft electrode in the form of a deformable member and including a wire passing through a lumen in the catheter with the wire having a bulbous electrode and a tapered portion at its distal end, according to embodiments.

FIG. 4A illustrates a catheter device of the present disclosure, according to embodiments. The catheter has a catheter shaft 400 with an internal lumen 402 through which a wire 422 passes. The catheter has a distal shaft electrode 404 in the form of a cage-like structure that is deformable and in its relaxed state has a diameter that is larger than the diameter of the catheter shaft 400. In embodiments, the distal shaft electrode 404 can comprise an expandable or a deformable member comprising a shape memory alloy or hyperelastic material, such as, for example, Nitinol, in the form of a cage-like structure generally comprising a multiplicity of struts. The struts of the structure are compliant and can deform under application of mechanical stress, while the cage-like structure can return (e.g., rapidly return) to its unstressed configuration as the stress is released. At the same time, the electrode material is electrically conducting and biocompatible.

While a single distal shaft electrode 404 is depicted in FIG. 4A, in embodiments, the distal portion of the catheter shaft 400 can have one or more electrodes disposed on it. An insulated lead wire (not shown) passes through lumen 402 to connect to the distal shaft electrode 404. In embodiments, the insulated lead wire can pass through a separate second lumen in the catheter shaft 400. In embodiments, the insulation of the electrical lead is configured to withstand a voltage of at least about 300 Volts across its thickness without dielectric breakdown. When the catheter device passes through a body cavity or passage and is mechanically constrained, electrode 404 deforms or collapses naturally to conform to the passage; where electrode 404 is not mechanically constrained, the distal electrode 404 maintains the relaxed-state diameter of its cage-like structure.

The wire or needle 422 has a bulbous distal electrode 406 and a distal taper 408 that narrows to a fine point for insertion into a tissue mass. In embodiments, the bulbous portion can be substantially spherical in geometry. In embodiments, the distal taper 408, or a portion thereof, can also be electrically conducting and so, together with the bulbous portion, it can comprise an extended electrode, while in alternate embodiments, the distal taper 408 can be electrically non-conducting. The major portion of the length of the wire proximal to the junction 412 with the bulbous electrode 406 can be electrically non-conducting or insulated. In embodiments, the wire insulation is configured to withstand a voltage of at least about 300 Volts across its thickness without dielectric breakdown. In embodiments, the insulation is configured to withstand a voltage of at least about 700 Volts across its thickness without dielectric breakdown. In embodiments, the insulation can be configured to withstand voltages between at least about 300 Volts and at least about 700 Volts across its thickness without dielectric breakdown, including, for example, at least about 400 Volts, at least about 500 Volts, or at least about 600 Volts. In embodiments, the wire 422 can be hollow, and an insulated electrical lead can run through the hollow portion and connect to the distal wire electrode 406.

Figure 4B:
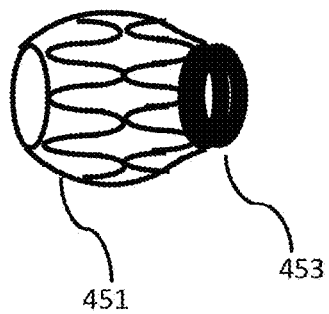
FIG. 4B illustrates a distal shaft electrode in the form of a deformable member with a cage-like structure that has a collared portion at the proximal end of the electrode, according to embodiments.

In embodiments, the electrodes 406 of the catheter device including those disposed on the wire or needle can be made of stainless steel, Nitinol, gold, platinum-iridium alloy, or other such biocompatible materials known in the art that are suitable for delivering electric current or voltage to tissue. The catheter shaft 400 can comprise any of a wide variety of polymeric materials known to those skilled in the art, such as, for example, polyurethane, PEBAX, polyethylene, etc. In embodiments, the major proximal portion of the wire can be covered with or comprise electrically insulating material such as, for example, Teflon, Parylene, Kevlar, etc. In embodiments, the distal shaft electrode 404 can comprise a cage-like structure comprising struts made at least in part from a highly elastic but compliant material such as, for example, Nitinol. The electrode 404 is mounted on the catheter shaft 400 and, in embodiments, can be crimped securely to the shaft at one end of the electrode while the other end fits over the catheter shaft 400 but is free to move or slide along the shaft 400 as the cage structure deforms. In embodiments, the secured end of the electrode 404 can have a collar portion that makes it easier for crimping or other secure attachment, and can also be used for attachment of the electrical lead. An example of such an electrode is illustrated in FIG. 4B, where a cage-like electrode 451 is shown with a collar 453 at the proximal end of the electrode 451. The collar portion can be configured to be fixedly attached to the catheter shaft and attached to a lead wire, e.g., for receiving current from a generator (e.g., generator 1350).

Figure 5:
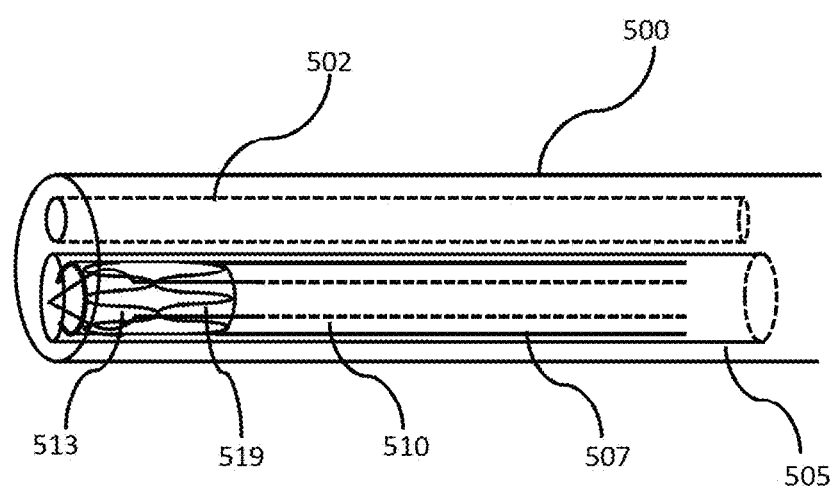
FIG. 5 is a schematic illustration of a catheter device of the present disclosure passing through the working channel of an endoscopic instrument with the distal end of the catheter inside the working channel and with the distal shaft electrode of the catheter deformed or collapsed as it is constrained by the lumen diameter of the working channel, according to embodiments.

FIG. 5 is a schematic illustration of an endoscopic instrument 500 with an imaging channel 502 and a working channel 505, according to embodiments. A therapeutic catheter device 507 of the present disclosure is inserted in the working channel 505. An energy delivery wire 510 with a bulbous electrode 513 passes through the catheter device 507. The catheter 507 has a distal shaft electrode 519 in the form of a deformable member or structure. Since the distal end of the catheter 507 is entirely inside the working channel 505 of the endoscopic instrument 500, the distal shaft electrode 519 has deformed to a collapsed configuration as it is disposed within the working channel 505 and as it passes through the working channel 505.

Figure 6:
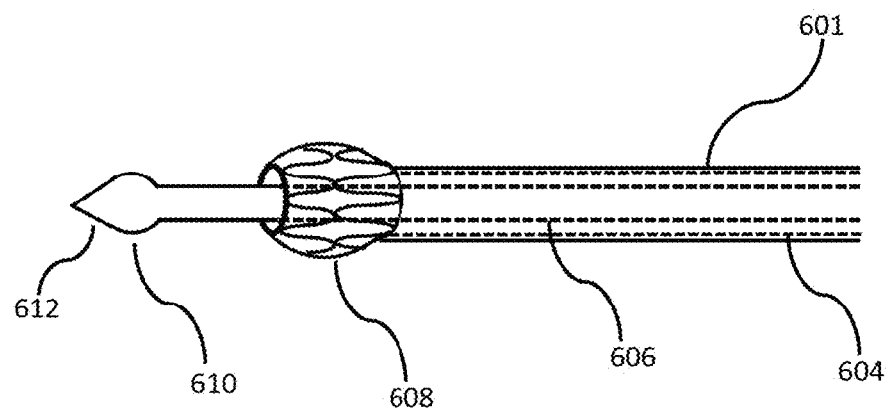
FIG. 6 is a schematic illustration of a catheter device of the present disclosure with its distal portion emerging from the distal end of the working channel of an endoscopic instrument such that the distal shaft electrode of the catheter has assumed its relaxed or undeformed and expanded configuration, and showing a bulbous electrode and distal taper at the distal end of the wire with the wire emerging from the distal end of the catheter, according to embodiments.

FIG. 6 is a schematic illustration of a catheter device 604 of the present disclosure with its distal portion shown emerged from the distal end of the working channel 601 of an endoscopic instrument, such that the distal shaft electrode 608 of the catheter 604 has assumed its relaxed or undeformed and expanded configuration, according to embodiments. The catheter device 604 can be structurally and/or functionally similar to other catheter devices described herein, including, for example, the catheter devices shown in FIGS. 4A and 5. FIG. 6 also depicts a wire 606 passing through the catheter 604, with the wire 606 having a bulbous distal electrode 610 and distal taper 612 at the distal end of the wire 606, and with the wire 606 emerging from the distal end of the catheter 604. The wire 606 can be structurally and/or functionally similar to other wires or needles described herein, including, for example, the wires shown in FIGS. 4A and 5. For clarity, the rest of the endoscopic instrument is not shown in FIG. 6, but can be structurally and/or functionally similar to the endoscopic instrument shown in FIG. 5.

Figure 7:
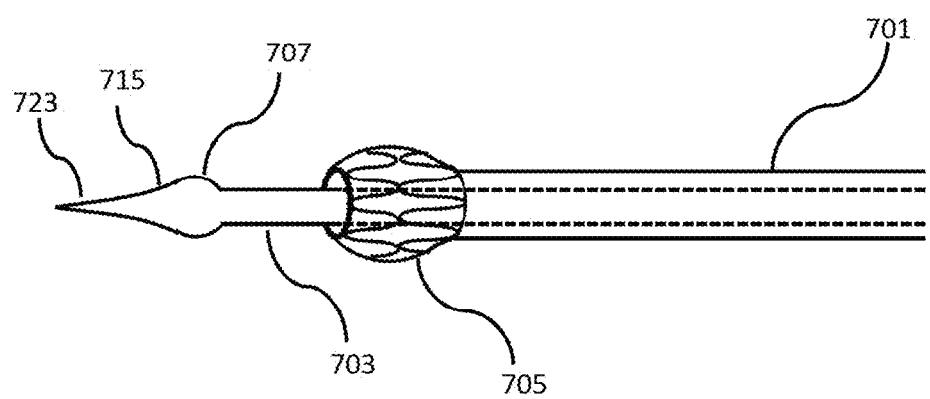
FIG. 7 illustrates a catheter device of the present disclosure with a distal shaft electrode in the form of a deformable member and including a wire passing through a lumen in the catheter with the wire having a bulbous electrode and a tapered portion at its distal end, with the tapered portion of the wire comprising two sections or portions with distinct or different tapers along each section, according to embodiments.

In embodiments, the distal taper of a wire described herein can have a distinct tapered section. For example, FIG. 7 illustrates a catheter device 701 of the present disclosure with a distal shaft electrode in the form of a deformable member 705 and including a wire 703 passing through a lumen in the catheter 701 with the wire having a bulbous electrode 707 and a tapered portion at its distal end. The tapered portion of the wire 703 can include two sections 715 and 723 with distinct or different tapers (e.g., tapering at different rates or according to different curvatures) along each respective section. In embodiments, the distal taper or tapered portion can converge to a fine point, e.g., for facilitating insertion into a tissue mass. Although two distinct tapered sections 715 and 723 are illustrated in this figure for the purpose of providing an example, it should be apparent that a single or multiple numbers of tapered sections can be used at the distal end of the wire without limitation and as convenient or necessary for the application at hand.

Figure 12:
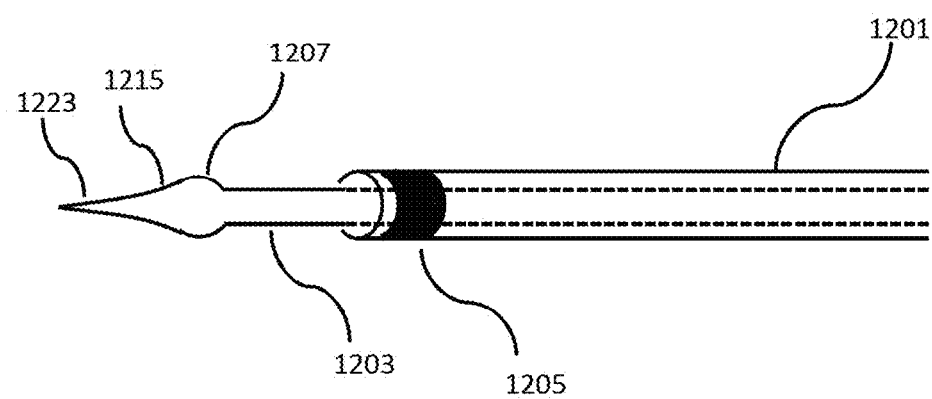
FIG. 12 illustrates a catheter device including a distal shaft electrode in the form of a ring electrode and including a wire passing through a lumen in of a catheter or outer shaft, according to embodiments.

In some embodiments, the distal shaft electrode can be in the form of a ring electrode (or multiple ring electrodes). For example, FIG. 12 illustrates a catheter device 1201 with a distal shaft electrode in the form of a ring electrode 1205 (or multiple ring electrodes). The catheter device 1201 can have a shaft that defines a lumen for receiving a wire 1203. The wire 1203 can be configured to translate or slide within the lumen of the shaft. In use, the wire 1203 can be extended distally from the catheter device 1201, as depicted in FIG. 12. The wire 1203 can be structurally and/or functionally similar to other wires described herein. For example, the wire 1203 can include a bulbous electrode 1207 and a tapered portion at its distal end. The tapered portion of the wire 1203 can include two sections 1215 and 1223 with distinct or different tapers along each respective section. The tapered portion can converge to a fine point, e.g., for facilitating insertion into a tissue mass. Although two distinct tapered sections 1215 and 1223 are illustrated in this figure for the purpose of providing an example, it should be apparent that a single or multiple numbers of tapered sections can be used at the distal end of the wire 1203 without limitation and as convenient or necessary for the application at hand.

Figure 8:
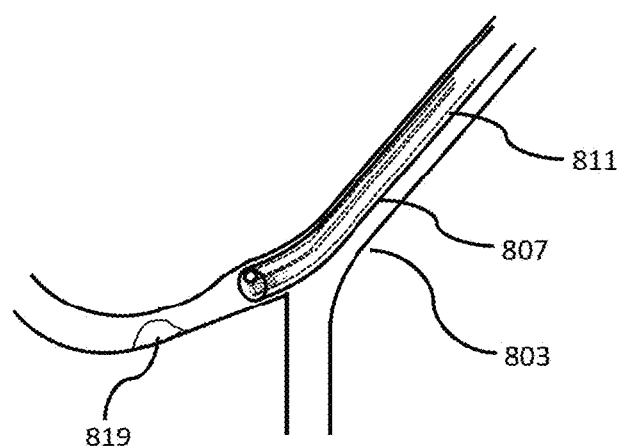
FIG. 8 illustrates an endoscopic instrument such as a bronchoscope in an anatomical passage (e.g., a bronchial airway) with a tissue mass or tumor present at a site along the passageway, with the catheter device of the present disclosure with its distal end inside the working channel of the endoscopic instrument, and with the endoscopic instrument positioned to permit easy access of the tissue mass with the wire or needle of the catheter device, according to embodiments.

In use, the catheters and wires of the present disclosure can be used to access an anatomical location for purposes of delivering ablation therapy. For example, FIG. 8 illustrates an endoscopic instrument 807 (e.g., a bronchoscope) in an anatomical passage 803 (e.g., a bronchial airway), with a tissue mass or tumor 819 present at a site along the passageway. The figure shows the working channel of the endoscopic instrument carrying a catheter device 811 with its distal portion entirely inside the working channel of the endoscopic instrument, and with the endoscopic instrument positioned to permit easy access of the tissue mass with the wire or needle of the catheter device 811.

Figure 9:
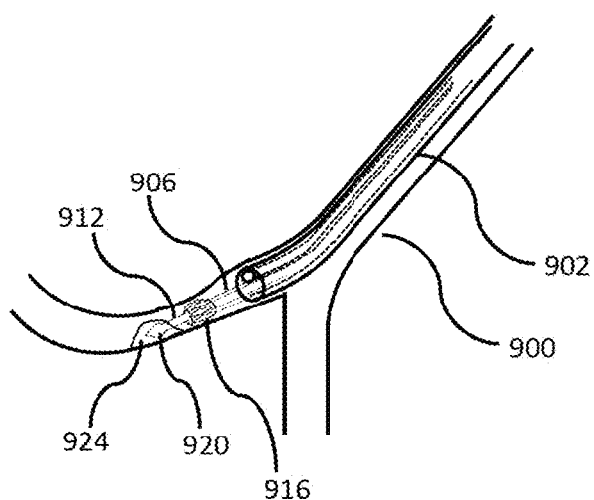
FIG. 9 illustrates an endoscopic instrument such as a bronchoscope in an anatomical passage (e.g., a bronchial airway) with a tissue mass or tumor present at a site along the passageway, with the catheter device of the present disclosure with its distal end and distal shaft electrode outside the working channel of the endoscopic instrument, with the wire of the catheter device emerging from the distal end of the catheter, and with the distal portion of the wire including its bulbous electrode inserted into the tissue mass or tumor for ablation of the tissue mass, according to embodiments.

Once an endoscopic instrument is suitably positioned, e.g., with image guidance from an imaging instrument or catheter that is passed through an imaging channel of the endoscopic instrument, the catheter device may be extended to access the treatment site. For example, FIG. 9 illustrates an endoscopic instrument 902 (e.g., a bronchoscope) in an anatomical passage 900 (e.g., a bronchial airway), with a tissue mass, nodule or tumor 924 present at a site along the passageway. The endoscopic instrument 902 can be structurally and/or functionally similar to other endoscopic instruments described herein, including endoscopic instrument 807. FIG. 9 depicts the catheter device 906 of the present disclosure with its distal end and distal shaft electrode 916 outside the working channel of the endoscopic instrument 902, with the wire 912 of the catheter device 906 emerging from the distal end of the catheter 906 and with the distal portion of the wire 912 including its bulbous electrode 920 inserted into the tissue mass or tumor 924 for ablation of the tissue mass. The placements of the catheter 906 and wire 912 can be performed with image guidance employed as needed.

After appropriate insertion of the wire, electroporation ablation is delivered in the form of a series of high voltage pulses delivered as a suitable waveform, for instance, as described in International Patent Application No. PCT/US2023/025064, incorporated above by reference. In embodiments, the distal electrode on the wire and the distal shaft electrode(s) of the catheter can have opposite electrical polarities for voltage delivery of the ablation waveform. In alternate embodiments, an electrical reference patch on the surface of the patient placed in skin contact with the patient can serve as oppositely polarized electrode for electrical pairing with the distal electrode on the wire for voltage delivery of the ablation waveform. The electric field generated upon voltage waveform delivery within a volume of tissue around the distal region of the wire drives tissue ablation within that volume. The voltage amplitude of the ablation waveform driving electroporation can range between about 300 Volts and about 10,000 Volts, including all values and sub-ranges therebetween.

In embodiments, the electric field in this tissue volume is large enough to generate irreversible electroporation of tissue, i.e., the tissue is killed. In other embodiments, the electric field within a tissue volume around the distal portion of the wire can reversibly electroporate tissue, rendering the cells in the tissue permeable to drugs over a time duration or period of time. In some embodiments, the wire or needle can be hollow for the direct infusion or delivery of tumor-treating drugs or therapeutic agents within the reversibly ablated zone or volume of tissue concomitant with or shortly after electroporation ablation is delivered. In this case, since only tissue within a desired zone is permeable to drugs, systemic and other side effects of tumor-treating drugs or therapeutic agents can be avoided. Alternatively, or additionally, drugs or therapeutic agents can be infused within the reversibly ablated zone by a separate device or needle.

Electroporation or pulsed field ablation application can be repeated at a given site as needed for an enhanced ablation effect before moving the catheter to a different location within the intended overall tissue volume and delivering ablation at the new location. In general, multiple such sites can be targeted in tumor or tissue mass; for example, between 1 and about 15 such locations can be targeted in each tumor mass, including all values and sub-ranges therebetween. The workflow for using the devices described herein can comprise the following sequence of steps: (i) insertion of the catheter device and an imaging device into a working channel and an imaging channel, respectively, of an endoscopic instrument; (ii) insertion of the endoscopic instrument to a location near or adjacent to a region of interest, with image guidance with the aid of the imaging device; (iii) extending the distal portion of the catheter so that its distal shaft electrode is outside the endoscopic instrument; (iv) extending the wire or needle from the distal end of the catheter and inserting the distal portion of the wire and the distal electrode of the wire at least partially into an ablation site; and (v) delivering a high voltage ablation waveform through the distal electrode of the wire to generate tissue electroporation within a tissue volume around the distal region of the wire.

Figure 10:
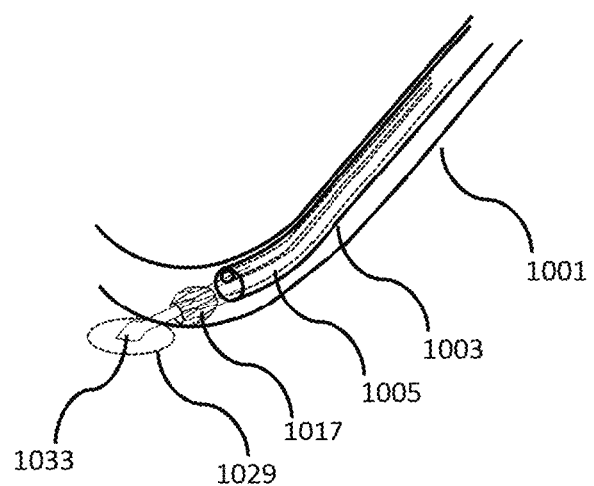
FIG. 10 illustrates an endoscopic instrument such as a bronchoscope in an anatomical passage (e.g., a bronchial airway or a digestive tract), with a tissue mass or tumor present at a site outside the passage and abutting it, with the catheter device of the present disclosure with its distal end and distal shaft electrode outside the working channel of the endoscopic instrument, and with the wire of the catheter device emerging from the distal end of the catheter and with the distal portion of the wire including its bulbous electrode inserted into the tissue mass or tumor for ablation of the tissue mass, according to embodiments.

In embodiments, the region of interest for ablation delivery may be outside or adjacent to an anatomical passage or cavity. For example, FIG. 10 illustrates an anatomical passage 1001 (for example, a digestive tract) with a tissue mass 1029 adjacent to the passage 1001 representing the region of interest for ablation delivery. The tissue mass 1029 may lie within an organ (for example, the pancreas). In FIG. 10, catheter device 1005 has passed through the working channel of an endoscopic instrument 1003 with its distal end and distal shaft electrode 1017 extending out from the working channel of the endoscopic instrument 1003. The wire or needle of the catheter device 1005 extends from the distal end of the catheter 1005 with the distal portion of the wire including its bulbous electrode 1033 inserted into the tissue mass or tumor 1029 for ablation of the tissue mass.

Similar to that described with respect to FIG. 9, after appropriate insertion of the wire, electroporation ablation is delivered in the form of a series of high voltage pulses delivered as a suitable waveform, for instance, as described in International Patent Application No. PCT/US2023/025064, incorporated above by reference. In embodiments, the distal electrode on the wire and the distal shaft electrode(s) of the catheter can have opposite electrical polarities for voltage delivery. In alternate embodiments, an electrical reference patch on the surface of the patient placed in skin contact with the patient can serve as an oppositely polarized electrode for electrical pairing with the distal electrode on the wire for voltage delivery of the ablation waveform. The electric field generated upon voltage waveform delivery within a volume of tissue around the distal region of the wire within the tissue mass 1029 drives tissue ablation within that volume. The voltage amplitude of the ablation waveform driving electroporation can range between about 300 Volts and about 10,000 Volts, including all values and sub-ranges therebetween.

Figure 11:
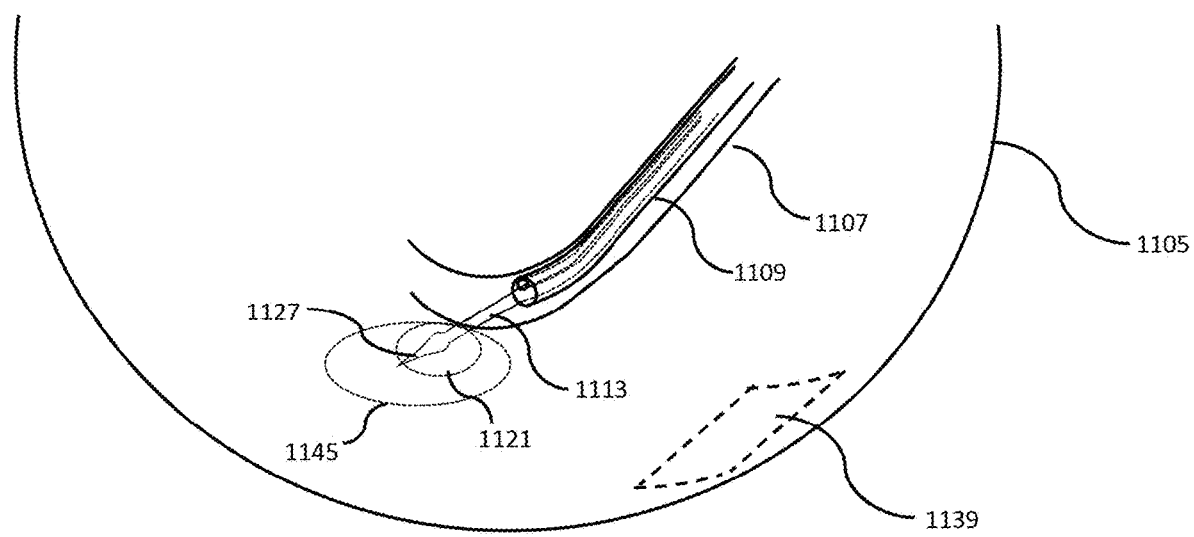
FIG. 11 schematically illustrates an endoscopic instrument such as an endoscope in an anatomical passage (e.g., a digestive tract) within the body of a subject anatomy, with a tissue mass or tumor present at a site outside the passage and within an anatomical organ abutting it, with the wire of the present disclosure emerging from the distal end of the endoscopic instrument and with the distal portion of the wire including its distal electrode inserted through the wall of the anatomical passage and into the anatomical organ and into the tissue mass for ablation of the tissue mass, according to embodiments. A surface patch or reference patch on the external surface of the subject anatomy serves as an electrode that is electrically paired with the distal electrode of the wire with an opposite electrical polarity for ablation delivery.

In embodiments, the wire or needle of the present disclosure can be used to deliver a voltage waveform by electrical pairing with a reference patch electrode placed externally on the surface of the patient. For example, FIG. 11 schematically illustrates an endoscopic instrument such as an endoscope 1109 in an anatomical passage 1107 (e.g., a digestive tract) within the body 1105 of a subject anatomy, with a tissue mass or tumor 1121 present at a site outside the passage 1107 and within an anatomical organ 1145 abutting the passage 1107. As shown in FIG. 11, the wire device 1113 of the present disclosure can extend from the endoscopic instrument 1109 with the distal portion 1127 of the wire 1113 including its distal electrode inserted through the wall of the anatomical passage and into the anatomical organ and into the tissue mass for ablation of the tissue mass 1121. A surface patch or reference patch 1139 on the external surface of the subject anatomy can be configured as an electrode that is electrically paired with the distal electrode of the wire with an opposite electrical polarity for ablation delivery.

Figure 14:
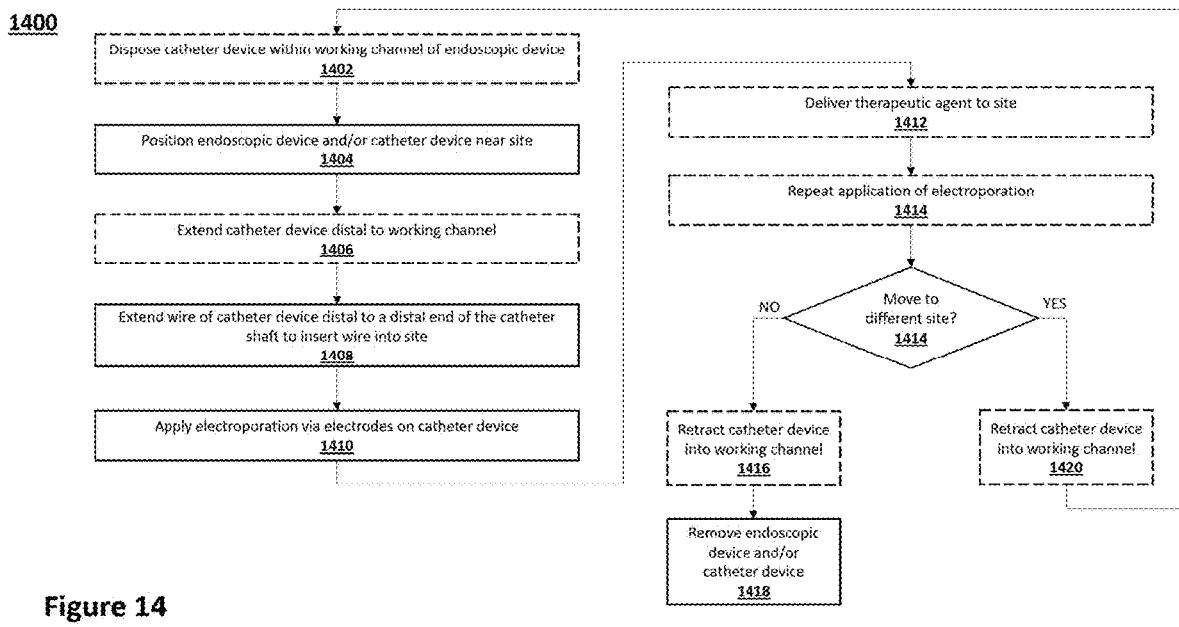
FIG. 14 is a flow chart depicting a method for delivering treatment using catheter devices as described herein, according to embodiments.

FIG. 14 depicts a method 1400 of using the endoscopic devices and catheter devices described herein (e.g., any of the endoscopic devices described in FIGS. 1-3 and 8-11 and/or catheter devices depicted in FIGS. 4A-13), according to embodiments. At 1402, a catheter device can optionally be disposed within a working channel of an endoscopic device. Alternatively, a catheter device may be positioned outside of an endoscopic device, e.g., alongside or adjacent to an endoscopic device. In some embodiments, a catheter device may be used without an endoscopic device. At 1404, the endoscopic device and/or catheter device can be positioned near a tissue site, e.g., by navigating the endoscopic device and/or catheter device through a body lumen or cavity. The tissue site can include a tissue mass, nodule, or tumor, or other element that requires treatment. In some embodiments, the endoscopic device can carry the catheter device within the working channel of the endoscopic device. In such embodiments, if the catheter device included an expandable electrode, then the expandable electrode may be held in an undeployed or constrained state within the working channel of the endoscopic device while the endoscopic device is being navigated to the tissue site. In some embodiments, the endoscopic device and the catheter device can be positioned separately at the tissue site. In some embodiments, the endoscopic device can be configured to provide image guidance for positioning the catheter device at the target site.

At 1406, if the catheter device is disposed within the working channel of the endoscopic device, the catheter device can be extended out of the working channel. The catheter device, as described above, can include a wire. At 1408, the wire of the catheter device can be extended out of a distal end of a catheter shaft of the catheter device such that a distal penetrating tip of the wire can be inserted into the tissue site. At 1410, the catheter device can apply electroporation to a zone of tissue at the tissue site. For example, a generator (e.g., generator 1350) can be configured to deliver voltage waveforms to the catheter device, to energize one or more electrodes of the catheter device to deliver electroporation. In some embodiments, the generator can be configured to cause the one or more electrodes to generate an electric field having sufficient strength to cause irreversible electroporation. In some embodiments, the generator can be configured to cause the electrodes to reversibly electroporate tissue. Optionally, at 1412, a therapeutic agent may be delivered to a zone of tissue at the tissue site. In some embodiments, the wire defines a lumen that is configured to deliver fluids or other agents to the zone of tissue at the tissue site. In some embodiments, one or more separate devices (e.g., another catheter or drug delivery device) can be configured to deliver fluids or other agents to the zone of tissue at the tissue site. In some embodiments, the catheter device can repeat the application of electroporation one or more times, at 1414. For example, electroporation can be repeated at a given site as needed for an enhanced ablation effect.

In some embodiments, the catheter device can be moved to one or more additional sites (1414: YES) to deliver electroporation to those sites. For each new site, the catheter device may be withdrawn into the working channel of the endoscopic device and/or the wire may be withdrawn into the catheter shaft, at 1420, and the endoscopic device and/or catheter device can be moved to the new tissue site, at 1404. The process of inserting the wire into the tissue site and delivering electroporation can then repeat, at 1406-1414. In some embodiments, the catheter device can be moved to between 1 and about 15 different sites. When the procedure is completed, i.e., no further tissue sites need to be ablated (1414: NO), then if the catheter device was delivered via a working channel of an endoscopic device, the catheter device can be optionally be retracted into the working channel, at 1416, and the entire assembly including the endoscopic device and the catheter device 1418 can be removed from the patient. In embodiments where the catheter device was used independently of an endoscopic device, the wire can be retracted into the catheter shaft, and the catheter device can be removed form the patient, at 1418.

As can be appreciated, each of 1402-1018 can be performed with image guidance. For example, the endoscopic device can be configured to capture images of the tissue site and/or catheter device to ensure proper positioning of the catheter device prior to delivering electroporation. In some embodiments, the endoscopic device may include an imaging channel where an imaging device can be extended therethrough to capture images of the tissue site and/or catheter device. In some embodiments, a separate imaging device or mechanism can be used to view and confirm the position of the catheter device relative to the tissue and the delivery of electroporation. In some embodiments, the imaging device (as extended through the endoscopic device or separately disposed near the tissue site) can be configured to be deflected, e.g., to capture different views around the tissue site. The imaging modality can comprise direct optical imaging, ultrasound imaging, or other imaging modalities as typically employed in the art.

The systems, devices, and methods described herein can be embodied in one or more embodiments, as set forth below.

Embodiment 1: Device for ablation delivery comprising a catheter with at least one distally located distal shaft electrode in the form of a compressible basket, with the catheter having a lumen for delivery of a needle device, with the needle device having a bulbous tip with a distal sharp point.

Embodiment 2: The basket in one embodiment having at least one collar portion for attachment to the shaft and to an electrical lead wire.

Embodiment 3: The basket made of superelastic material such as Nitinol alloy.

Embodiment 4: The needle device being electrically insulated along the major portion of its length and with a fraction of the length of the distal tapered portion of the needle being electrically conducting and exposed, with the electrical insulation capable of withstanding at least 300 Volts across its thickness without dielectric breakdown.

Embodiment 5: The basket attached to an electrically insulated lead wire with the electrical insulation of the lead wire capable of withstanding at least 300 Volts across its thickness without dielectric breakdown.

Embodiment 6: The needle device in embodiments having a bulbous tip including a bulbous portion and at least two tapered portions distal to the bulbous portion, with a distal tapered portion converging to a fine point.

Embodiment 7: The catheter device capable of being used for ablation delivery of high voltage pulses with the needle device and distal shaft electrode electrically polarized with opposite electrical polarities.

Embodiment 8: The catheter having an outer diameter in the range between approximately 1 mm and approximately 6 mm.

Embodiment 9: The largest diameter of the distal shaft electrode in its relaxed or expanded state in the range between approximately 1 mm and approximately 15 mm.

Embodiment 10: The needle device extending up to about 60 mm beyond the distal tip of the catheter shaft when fully deployed or extended.

Embodiment 11: The bulbous portion of the distal electrode of the needle having a maximum diameter between approximately 0.4 mm and approximately 4 mm, Embodiment 12: The length of the distal tapered portion of the needle device distal to the bulbous portion of the electrode ranging between approximately 1 mm and approximately 30 mm.

Embodiment 13: A system comprising a generator and a catheter device for ablation delivery comprising a catheter with at least one distally located distal shaft electrode in the form of a compressible basket, with the catheter having a lumen for delivery of a needle device, with the generator capable of delivery of high voltage pulses to the distal shaft electrode and the needle device for ablation delivery.

Embodiment 14: A method of use of a catheter device for ablation delivery comprising a catheter with at least one distally located distal shaft electrode in the form of a compressible basket, with the catheter having a lumen for delivery of a needle device, with the catheter device being introduced into one channel of an endoscopic instrument navigated inside a subject anatomy, with a second channel of the endoscopic instrument used for imaging of the subject anatomy, extending the catheter device out of the distal end of the endoscopic instrument, positioning the catheter device near a target location, extending the needle device out of the catheter and into tissue, and delivering high voltage ablation pulses with the distal shaft electrode and needle device electrically polarized with opposite electrical polarities.

While specific examples have been provided in the figure for example and illustrative purposes, it should be clear that variants such as different numbers of lumens, different numbers of electrodes, different electrode, catheter and wire diameters, different electrode and shaft materials, and the like can be constructed without limitation and based on the teachings herein.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

As used herein, the terms "about" and/or "approximately" when used in conjunction with numerical values and/or ranges generally refer to those numerical values and/or ranges near to a recited numerical value and/or range. In some instances, the terms "about" and "approximately" may mean within ±10% of the recited value. For example, in some instances, "about 100 [units]" may mean within ±10% of 100 (e.g., from 90 to 110). The terms "about" and "approximately" may be used interchangeably.

The invention claimed is:

1. An apparatus, comprising:
an outer shaft defining a lumen;
a first electrode disposed on a distal end of the outer shaft, the first electrode including a compressible basket; and
an inner shaft slidably disposable in the lumen, the inner shaft including a distal tip having a bulbous portion and a tapered portion that tapers to a distal sharp end, the distal sharp end configured to be extended distal to the outer shaft and inserted into a tissue site, the distal tip including a second electrode,
the first and second electrodes configured to deliver electroporation to a zone of tissue at the tissue site.

2. The apparatus of claim 1, further comprising a lead wire, the compressible basket including at least one collar portion that is fixedly attached to the outer shaft and attached to the lead wire.

3. The apparatus of claim 2, wherein the lead wire is an electrically insulated lead wire having an insulating layer that is configured to withstand at least about 300 Volts across a thickness of the insulating layer without dielectric breakdown.

4. The apparatus of claim 1, wherein the compressible basket is formed of a superelastic material.

5. The apparatus of claim 1, wherein the inner shaft includes an insulating layer that covers a substantial majority of an outer surface of the inner shaft, and the second electrode is an exposed conductive portion of the distal tip.

6. The apparatus of claim 5, wherein the exposed conductive portion is disposed on the tapered portion of the distal tip.

7. The apparatus of claim 5, wherein the insulating layer is configured to withstand at least about 300 Volts across a thickness of the insulating layer without dielectric breakdown.

8. The apparatus of claim 1, wherein the tapered portion is a first tapered portion, and the distal tip includes a second tapered portion adjacent to the first tapered portion,
the second tapered portion tapering from the bulbous portion to a proximal end of the first tapered portion.

9. The apparatus of claim 8, wherein the first tapered portion and the second tapered portion have different tapers.

10. The apparatus of claim 1, wherein the first and second electrodes are configured to be electrically polarized with opposite polarities to deliver electroporation to the zone of tissue.

11. The apparatus of claim 1, wherein the first and second electrodes are configured to deliver electroporation to ablate the zone of tissue.

12. The apparatus of claim 1, wherein the first and second electrodes are configured to deliver electroporation to reversibly electroporate the zone of tissue,
- the inner shaft further including a fluid delivery lumen configured to deliver a therapeutic agent to the zone of tissue while or after the zone of tissue has been reversibly electroporated.

13. The apparatus of claim 1, wherein the outer shaft has an outer diameter between approximately 1 mm and approximately 6 mm.

14. The apparatus of claim 1, wherein the compressible basket in a relaxed state has a maximum outer diameter of between approximately 1 mm and approximately 15 mm.

15. The apparatus of claim 1, wherein the inner shaft is configured to be extended up to about 60 mm beyond a distal tip of the outer shaft when fully deployed.

16. The apparatus of claim 1, wherein the bulbous portion of the distal tip has a maximum diameter of between approximately 0.4 mm and approximately 4 mm.

17. The apparatus of claim 1, wherein a portion of the distal tip distal to the bulbous portion is between approximately 1 mm and approximately 30 mm.

\* \* \* \* \*